United States Patent
Takatori et al.

(10) Patent No.: US 6,637,566 B2
(45) Date of Patent: Oct. 28, 2003

(54) LOCK-UP CONTROL DEVICE FOR TORQUE CONVERTER OF AUTOMATIC TRANSMISSION

(75) Inventors: Kazuhiro Takatori, Fuji (JP); Osamu Sato, Fuji (JP); Tatsuya Imamura, Fuji (JP); Yasushi Fujita, Fuji (JP); Kazuhito Sano, Fuji (JP); Kazuo Tomioka, Fuji (JP)

(73) Assignee: Jacto Ltd (JP)

( * ) Notice: Subject to any disclaimer, the term of this patent is extended or adjusted under 35 U.S.C. 154(b) by 0 days.

(21) Appl. No.: 10/121,023

(22) Filed: Apr. 11, 2002

(65) Prior Publication Data

US 2002/0175036 A1 Nov. 28, 2002

(30) Foreign Application Priority Data

Apr. 11, 2001 (JP) ........................................ 2001-112440

(51) Int. Cl.$^7$ ............................................... F16D 61/14
(52) U.S. Cl. ............................ 192/3.3; 477/65; 477/176
(58) Field of Search ............................... 192/3.29, 3.3, 192/103 F; 477/62, 64, 169, 176, 65, 78

(56) References Cited

U.S. PATENT DOCUMENTS

| | | | | | |
|---|---|---|---|---|---|
| 5,498,217 | A | * | 3/1996 | Maruyama et al. | 477/169 |
| 5,588,937 | A | * | 12/1996 | Kono et al. | 477/169 |
| 5,599,254 | A | * | 2/1997 | Tomisawa et al. | 477/176 |
| 5,626,536 | A | * | 5/1997 | Kono et al. | 192/3.3 |
| 5,722,912 | A | * | 3/1998 | Narita | 477/64 |
| 5,989,156 | A | * | 11/1999 | Matsubara et al. | 477/169 |
| 6,077,188 | A | * | 6/2000 | Futamura et al. | 477/65 |
| 6,482,126 | B2 | * | 11/2002 | Kawaguchi | 192/3.3 |

* cited by examiner

Primary Examiner—Rodney H. Bonck
(74) Attorney, Agent, or Firm—Rossi & Associates

(57) ABSTRACT

An initial command oil pressure of a lock-up control of coasting lock-up region is set by using a lock-up learning correction amount calculated by a learning control in a lockup control of the other of the plurality of lock-up regions such as slip lock-up region and complete lock-up region when one of the lock-up control of these other lock-up regions is performed before the lock-up control of the coasting lock-up region. Thus, a lock-up learning correction amount can be commonly used among three kinds of lock-up regions, and a lock-up as set is early realized in each lock-up region.

3 Claims, 5 Drawing Sheets

LOCK-UP CONTROL DEVICE FOR TORQUE CONVERTER OF AUTOMATIC TRANSMISSION

BACKGROUND OF THE INVENTION

1. Field of the Invention

The present invention relates to a lock-up control device for a torque converter with a lock-up clutch in an automatic transmission, and more particularly, to improvements in a learning control of the lock-up control system.

2. Description of the Prior Art

A torque converter used in an automatic transmission for a vehicle is provided with a lock-up clutch and is completely locked up during running at a high speed, as shown in FIG. 6. Moreover, the lock-up clutch is held in a slip lock-up mode, that is, in an engagement state in which the lock-up clutch is given a small degree of slip (target slip) in a predetermined intermediate speed range for the purpose of improving fuel economy and reducing vibration.

During a coasting lock-up control wherein the engine is in the idle running-condition with the accelerator pedal released in the lock-up region, an engagement capacity of the lock-up clutch must be made into a level corresponding to a lowered engine-output in order to maintain a predetermined slip degree. Otherwise, the lock-up clutch is rapidly engaged and torque fluctuations and shift shock occur. In order to avoid such problems, an engaging oil pressure of the lock-up clutch is lowered to a predetermined value.

In FIG. 6, a region except a complete lock-up region, a slip lock-up region and a coasting lock-up region is a converter region wherein a slip control is not performed.

An engaging oil pressure in the coasting lock-up region must be a oil pressure value which restricts torque fluctuations and shift shock and also does not degrade the response of increase in the engaging oil pressure when the accelerator pedal is redepressed. Since this oil pressure value is dispersed due to individual difference and aging of the torque converter, a learning control is performed with respect to a preset basic initial pressure.

In order to prevent the engagement shock of the lock-up clutch in the complete lock-up region and the slip lock-up region, the engaging oil pressure is raised again from a predetermined initial pressure which has been set according to a map or the like. However, since it is impossible to be freed from the individual difference and the aging as described above, a learning control is also performed in these two regions.

In the conventional automatic transmission, the above learning control is separately executed in each of the complete lock-up region, the slip lock-up region and the coasting lock-up region. For example, in order to obtain a learning correction amount suitable for correcting a basic initial pressure in the coasting lock-up region, therefore, a coasting lock-up control must be repeated for a long time period and requires a considerably long time. This disadvantage applies also to the complete lock-up region and the slip lock-up region.

SUMMARY OF THE INVENTION

The present invention has been made in view of the aforementioned conventional problem, and it is an object to provide a lock-up control device for a torque converter of an automatic transmission which is capable of realizing a proper learning control of an engaging oil pressure of a lock-up clutch of the torque converter in a short time period.

To accomplish this object, the present invention provides a lock-up control device for a torque converter of an automatic transmission equipped with a lock-up clutch, including learning control means for performing a learning control of an initial command oil pressure for a lock-up control for each of plurality of lock-up regions according to vehicle running condition, the learning control means setting the initial command oil pressure by adding a lock-up learning correction amount to a basic initial pressure set for each of the plurality of lock-up regions, and setting an initial command oil pressure of a lock-up control of one of the plurality of lock-up regions by using a lock-up learning correction amount calculated by a learning control in a lockup control of the other of the plurality of lock-up regions when the lock-up control of the other of the plurality of lock-up regions is performed before the lock-up control of the one of the plurality of lock-up regions.

In the one of the plurality of lock-up regions, an initial command oil pressure is determined by adding a lock-up learning correction amount calculated in the learning control performed in the other lock-up regions to a basic initial pressure, and hence the use of the learning result obtained in the other lock-up regions allows a proper basic initial pressure to be quickly achieved.

The one of the plurality of lock-up regions may be a coasting lock-up region with the other of the plurality of lock-up regions being a slip lock-up region or a complete lock-up region, or the one of the plurality of lock-up regions may be a slip lock-up region or a complete lock-up region with the other of the plurality of lock-up regions being a coasting lock-up region.

Since a lock-up learning correction amount can be commonly used among three kinds of lock-up regions, a lock-up as set is early realized in each lock-up region.

The above and further objects and features of the invention will be more fully apparent from the following description when the same is considered with reference to the accompanying drawings.

DESCRIPTION OF THE PREFERRED EMBODIMENT

Here will be described the embodiment of the invention with reference to the accompanying drawings.

Figure 1:
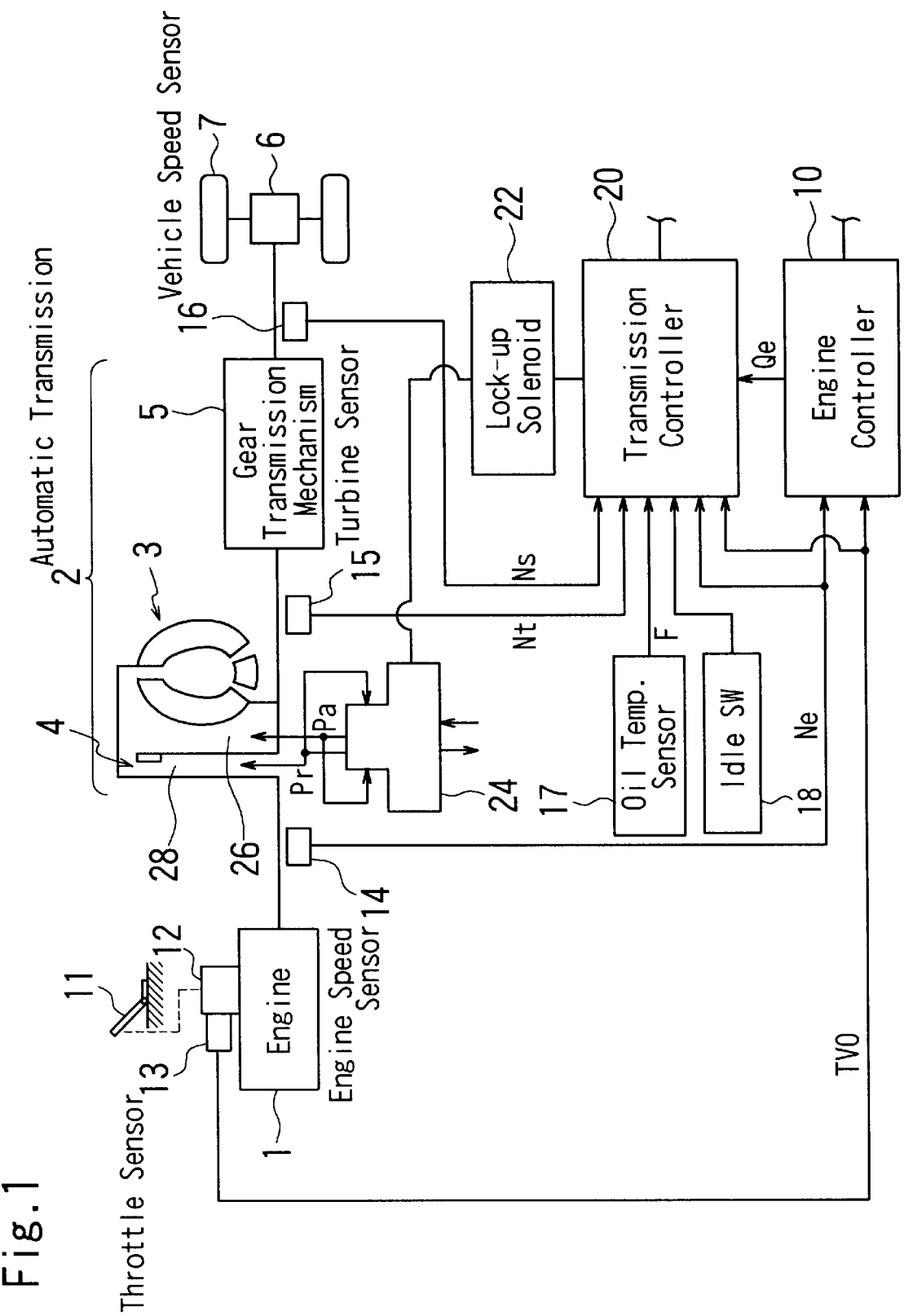
FIG. 1 is a view showing a drive train of a vehicle according to an embodiment of the present invention.

FIG. 1 is a view showing a drive train of a vehicle provided with a lock-up control system according to an embodiment of the present invention.

An automatic transmission 2 constituted by a torque converter 3 having a lock-up clutch 4 built therein and a gear transmission mechanism 5 is connected to an engine 1, and output of the gear transmission mechanism 5 is transmitted to wheels 7 through a differential/final reduction gear 6.

An engaging oil pressure of the lock-up clutch 4 is represented by a differential pressure between an apply pressure Pa to be supplied to an apply chamber 26 and a release pressure Pr to be supplied to a release chamber 28 by a lock-up control valve 24. The lock-up control valve 24 receives a signal pressure which is controlled by a lock-up solenoid 22 with a fixed pilot pressure set as an original pressure and controls the apply pressure Pa and the release pressure Pr in response to a duty command from a transmission controller 20.

An engine controller 10 controlling the engine 1 is connected with a throttle sensor 13 and an engine speed sensor 14. The engine controller 10 receives an opening signal (throttle opening TVO) of a throttle valve 12 of the engine 1, which valve is opened and closed based on operation of an accelerator pedal 11, and a rotation speed signal (engine speed Ne) of an output shaft of the engine and determines an demanded engine torque Qe based on these signals and controls a fuel injection amount and ignition timing of the engine 1.

The transmission controller 20 controlling the automatic transmission 2 receives a rotation speed of turbine (turbine speed) Nt from a turbine sensor 15, a vehicle speed Ns from a vehicle speed sensor 16 and an oil temperature F from an oil temperature sensor 17 in addition to the throttle opening TVO and the engine speed Ne. Further, the transmission controller 20 receives an engine torque Qe from the engine controller 10. The transmission controller 20 is connected with an idle switch 18 for detecting an idle condition of the engine 1. When the idle switch 18 is ON, the engine is in an idle condition, and when the idle switch 18 is OFF, the engine is in a drive condition.

On the basis of these signals, the transmission controller 20 switches a rotation transmission path in the gear transmission mechanism 5 and realizes a plurality of gear positions according to running conditions and at the same time controls the engaging oil pressure of the lock-up clutch 4 according to respective modes of the complete lock-up, the slip lock-up and the coasting lock-up.

In FIG. 1, output controls of the transmission controller 20 are exemplified only by output to the lock-up solenoid 22 which is in a control system of the lock-up clutch 4.

Figure 2:
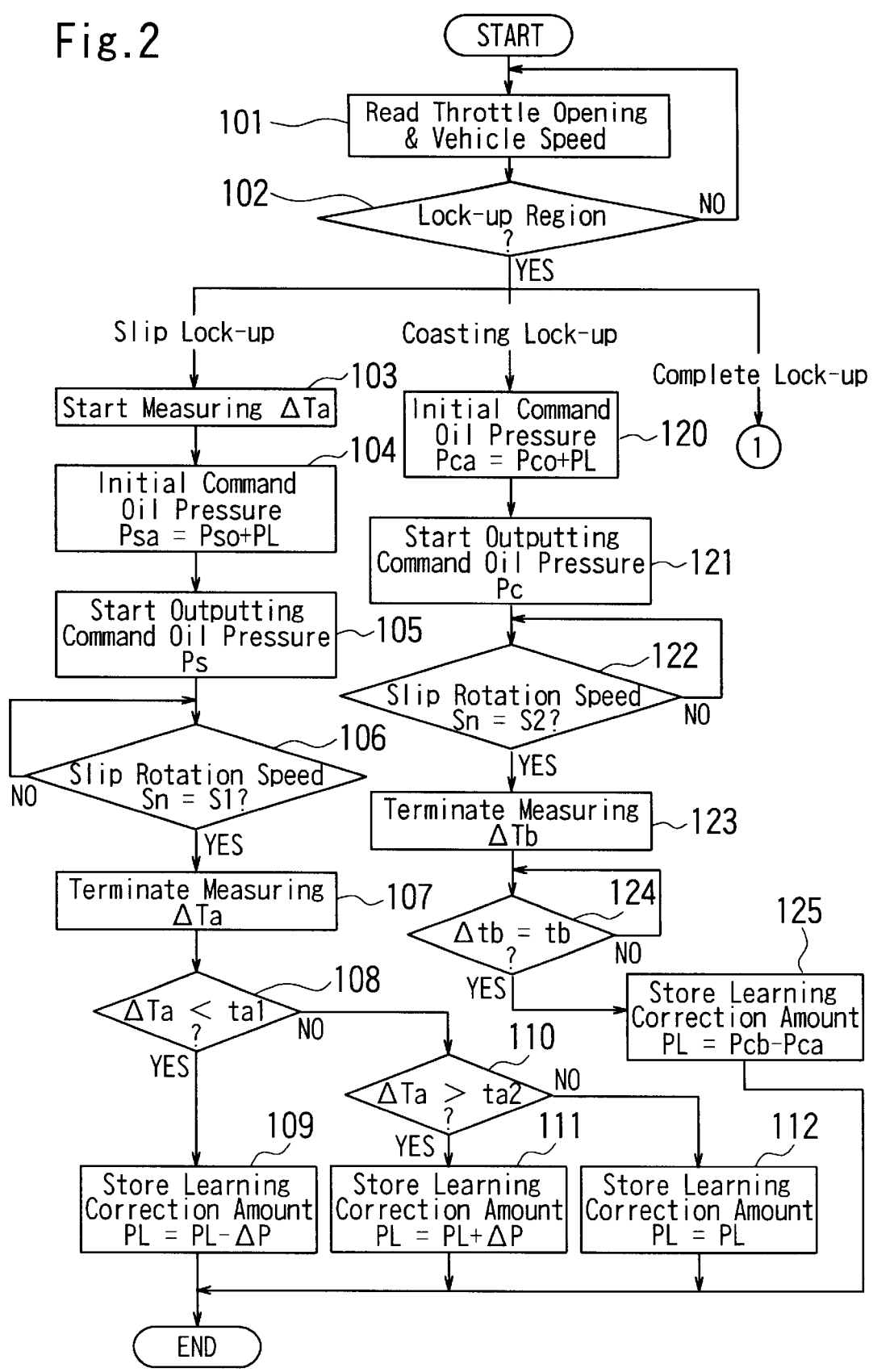
FIG. 2 is a flow chart showing a control flow of the embodiment according to the present invention.
Figure 3:
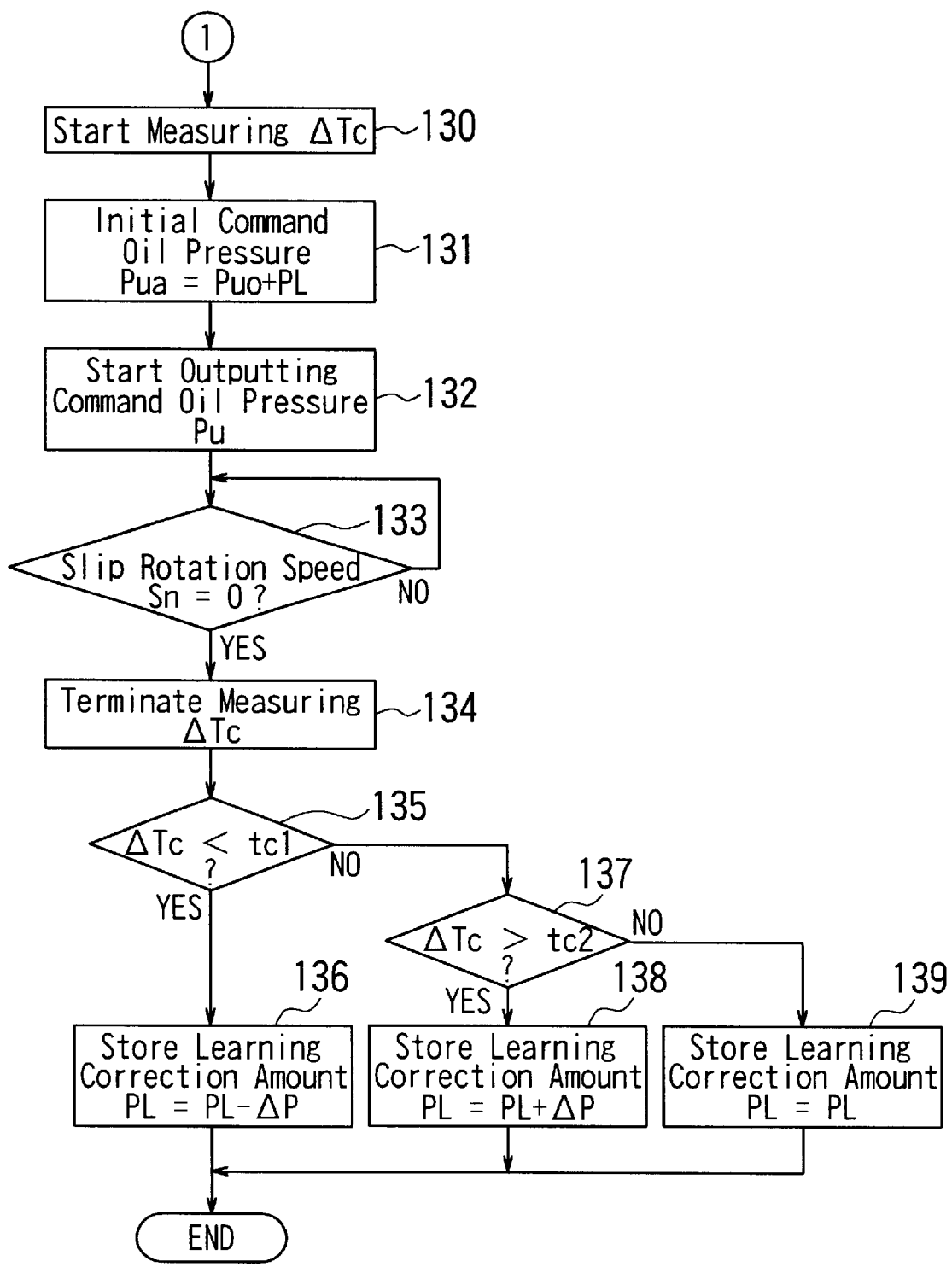
FIG. 3 is a flow chart showing a control flow of the embodiment according to the present invention.

FIGS. 2 and 3 are flow charts showing control flows by the transmission controller 20.

First in a step 101, the transmission controller 20 reads the throttle opening TVO from the throttle sensor 13, the vehicle speed Ns from the vehicle speed sensor 16 and a state of the idle switch 18.

Figure 6:
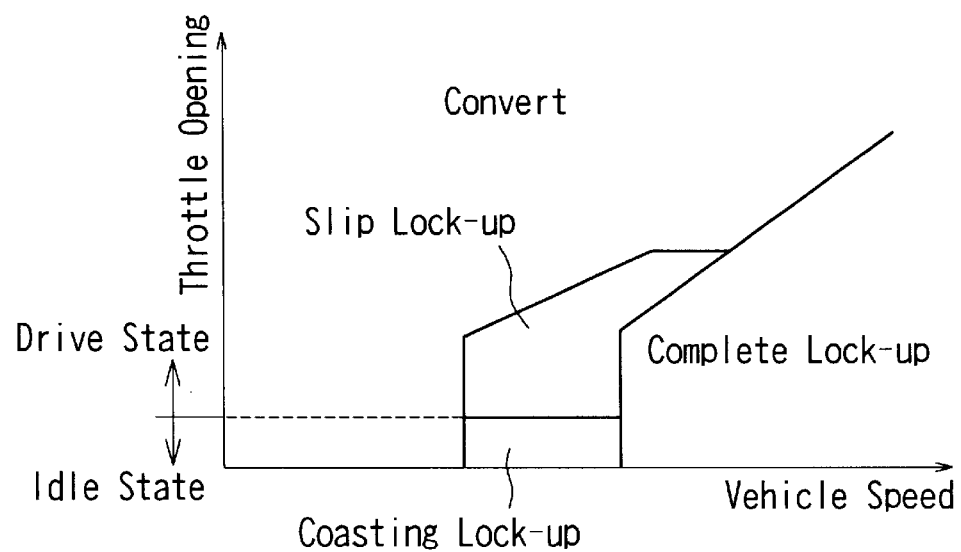
FIG. 6 is a view showing a lock-up region.

In a step 102, it is checked whether a running condition is changed to one of the lock-up regions, as shown in FIG. 6, based on the read data.

When there is no change of the regions, the above steps 101 and 102 are repeated. If there is the change of the regions, the routine is advanced to a step 103, a step 120 or a step 130 depending on which lock-up region the running condition is changed to.

When the running condition changes from the converter region to the slip lock-up region at a time point t0, the routine is advanced to the step 103 and the measurement of an elapsed time $\Delta$Ta from the time point t0 is started.

In a step 104, an initial command oil pressure Psa is calculated by adding a lock-up learning correction amount PL to a slip lock-up basic initial pressure Pso. The slip lock-up basic initial pressure Pso is set in advance based on the engine speed Ne and the vehicle speed Ns and is prepared as a map. The lock-up learning correction amount PL is set to "0" at the initial flow of the operation steps.

Figure 4A:
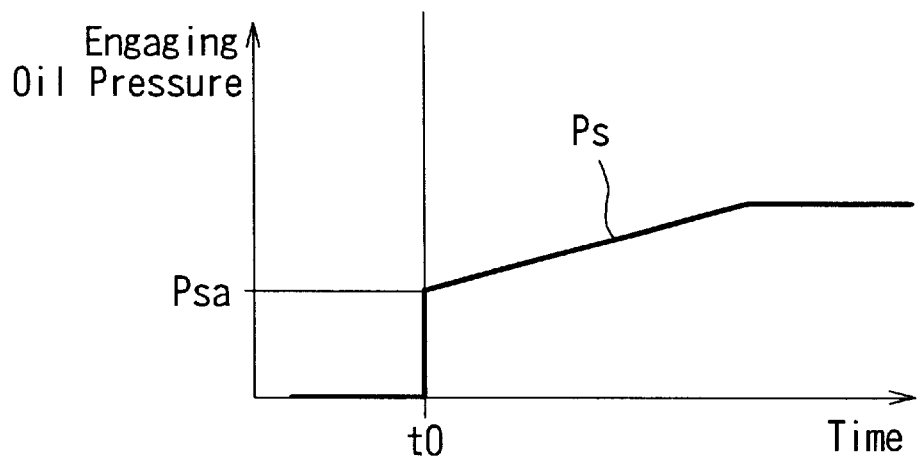
FIG. 4A is a view showing a change in a command oil pressure in a slip lock-up region.

In a step 105, the initial command oil pressure Psa is set as a starting point, and the output of a command oil pressure Ps increasing with a predetermined slope (gradient) to the lock-up solenoid 22 is started from the time point t0, as shown in FIG. 4A.

In a step 106, it is checked whether a slip rotation speed of the torque converter 3, that is, a difference Sn between the engine speed Ne and the turbine speed Nt reaches a target slip S1.

If the target slip S1 is not achieved, the step 106 is repeated. When the slip rotation speed Sn of the torque converter 3 reaches the target slip S1, the measurement of the elapsed time $\Delta$Ta is terminated at a step 107.

Figure 4B:
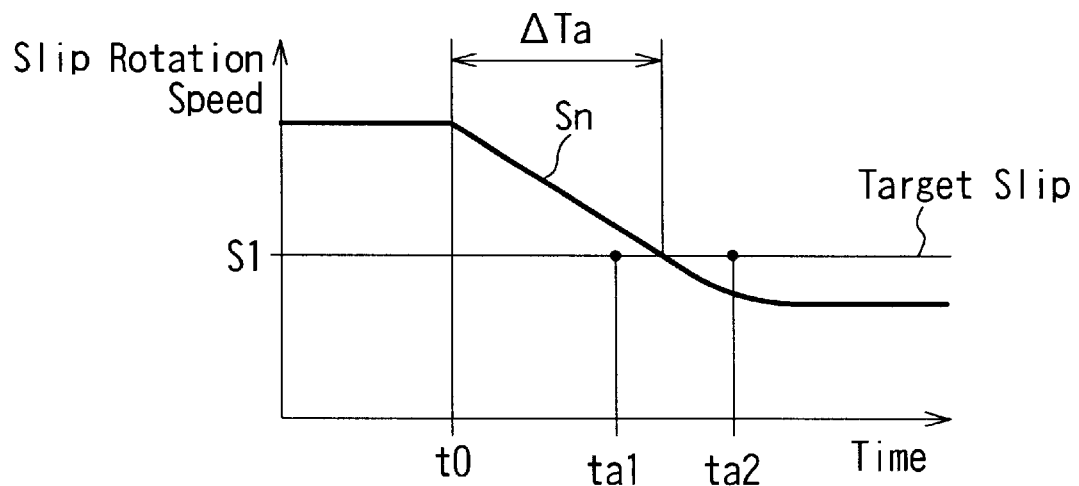
FIG. 4B is a view showing a change in a slip rotation speed of a torque converter in a slip lock-up region.

The result of this measurement is compared with a predetermined threshold value, as shown in FIG. 4B.

In short, in a step 108, it is checked whether the elapsed time $\Delta$Ta required until the slip rotation speed Sn reaches the target slip S1 is shorter than a first threshold value ta1.

In case the elapsed time $\Delta$Ta is shorter than the first threshold value ta1, it is determined that the engaging oil pressure is excessively high. Then, in a step 109, a value PL is calculated by subtracting a predetermined unit amount $\Delta$P from the lock-up learning correction amount PL as follows:

$$PL = PL - \Delta P$$

This obtained value PL is stored as a lock-up learning correction amount for the next lock-up.

On the other hand, in case the elapsed time $\Delta$Ta is the first threshold value ta1 or more, the routine is advanced to a step 110, and it is checked whether the elapsed time $\Delta$Ta is longer than a second threshold value ta2.

When the elapsed time $\Delta$Ta is longer than the second threshold value ta2, it is determined that the engaging oil pressure is insufficient. Then, in a step 111, a value PL is calculated by adding a predetermined unit amount $\Delta$P to the lock-up learning correction amount PL as follows:

$$PL = PL + \Delta P$$

This obtained value PL is stored as a lock-up learning correction amount for the next lock-up.

When the elapses time $\Delta$Ta is the threshold value ta2 or less, the routine is advanced to a step 112, and the current lock-up learning correction amount PL is maintained and stored as it is.

Here, after the slip rotation speed Sn reaches the target slip S1, a feedback control is continued within the slip lock-up region to retain this target slip S1.

When it is determined that the running condition changes from other regions to the coasting lock-up region in the step 102, the routine is advanced to a step 120.

In the step 120, an initial command oil pressure Pca is calculated by adding the lock-up learning correction amount PL to a coasting lock-up basic initial pressure Pco. The coasting lock-up basic initial pressure Pco is set in advance based on the engine speed Ne and the vehicle speed Ns and prepared as a map. The lock-up learning correction amount PL is set to "0" at the initial flow of the operation steps.

In a step 121, the initial command oil pressure Pca is set as an initial pressure, as shown in FIG. 5, and an output of a command oil pressure Pc of the feedback control to the lock-up solenoid 22 is started so that the slip rotation speed Sn of the torque converter 3 achieves a predetermined target slip S2.

Figure 5A:
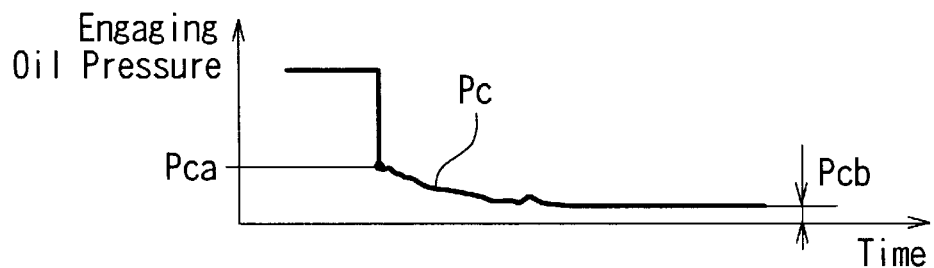
FIG. 5A is a view showing a change in a command oil pressure in a coasting lock-up region.
Figure 5B:
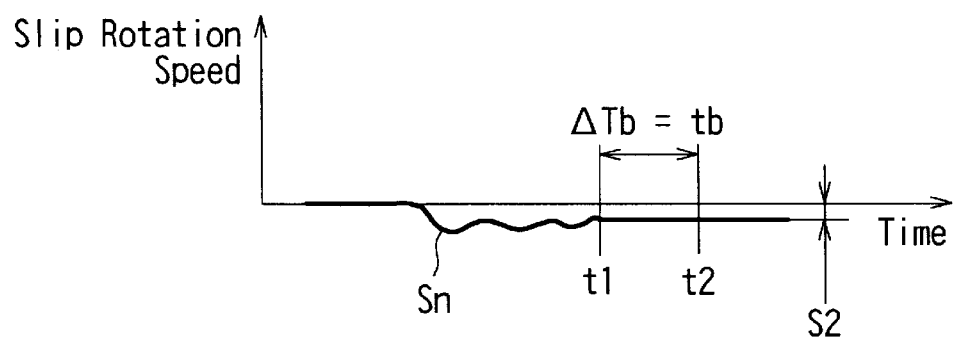
FIG. 5B is a view showing a change in a slip rotation speed of a torque converter in a coasting lock-up region.

Here, FIG. 5A shows the change of the command oil pressure Pc and FIG. 5B shows the change of the slip rotation speed Sn.

In a step 122, it is checked whether the slip rotation speed Sn of the torque converter 3 reaches the target slip S2. In the coasting lock-up region, the turbine speed is higher than the engine speed and the target slip S2 is a negative value.

Until the slip rotation speed Sn reaches the target slip S2, the check of the step 122 is repeated. When the slip rotation speed Sn matches the target slip S2 at a time point t1, the measurement of an elapsed time $\Delta Tb$ from the time point t1 is started.

In a step 124, after the slip rotation speed Sn matches the target slip S2, it is checked whether a predetermined time tb elapses.

When a state where the slip rotation speed Sn matches the target slip S2 continues for the predetermined time tb, the measurement of the elapsed time $\Delta Tb$ is terminated at a time point t2 and the routine is advanced to a step 125.

In the step 125, a difference PL between the engaging oil pressure at the time point t2 (current command oil pressure Pcb) and the initial command oil pressure Pca obtained in the step 120 of this flow is calculated as follows:

$$PL=Pcb-Pca$$

This difference PL is stored as a lock-up learning correction amount for the next lock-up.

Here, the feedback control for holding the slip rotation speed Sn to the target slip S2 is continued while the running condition is in the coasting lock-up region.

When it is determined by the check of the earlier step 102 that the running condition is changed from another region to the complete lock-up region, the routine is advanced to a step 130, and the measurement of an elapsed time $\Delta Tc$ from a time point of this change is started.

In a step 131, an initial command oil pressure Pua is calculated by adding the lock-up learning correction amount PL to a complete lock-up basic initial pressure Puo. The complete lock-up basic initial pressure Puo is set in advance based on the engine speed Ne and the vehicle speed Ns and prepared as a map. The lock-up learning correction amount PL is set to "0" at the initial flow of the operation steps.

In a step 132, the initial command oil pressure Pua is set as an initial pressure, and the output of a command oil pressure Pu increasing with a predetermined slope to the lock-up solenoid 22 is started.

In a step 133, it is checked whether the lock-up clutch 4 is completely engaged and the slip rotation speed Sn of the torque converter 3 reaches "0".

The check of the step 133 is repeated until the slip rotation speed Sn reaches "0". When the lock-up clutch 4 is completely engaged, the measurement of the elapsed time $\Delta Tc$ is terminated in a step 134.

In a step 135, it is checked whether the elapsed time $\Delta Tc$ is shorter than a first threshold value tc1.

In case the elapsed time $\Delta Tc$ is shorter than the first threshold value tc1, it is determined that the engaging oil pressure is excessively high. Then, in a step 136, a value PL is calculated by subtracting a predetermined unit amount $\Delta P$ from the lock-up learning correction amount PL as follows:

$$PL=PL-\Delta P$$

This calculated value PL is stored as a lock-up learning correction amount for the next lock-up.

On the other hand, in case the elapsed time $\Delta Tc$ is the first threshold value tc1 or more, the routine is advanced to a step 137, and it is checked whether the elapsed time $\Delta Tc$ is longer than a second threshold value tc2.

When the elapsed time $\Delta Tc$ is longer than the second threshold value tc2, it is determined that the engaging oil pressure is insufficient. Then, in a step 138, a value PL is calculated by adding a predetermined unit amount $\Delta P$ to the lock-up learning correction amount PL as follows:

$$PL=PL+\Delta P$$

This obtained value PL is stored as a lock-up learning correction amount for the next lock-up.

When the elapse time $\Delta Tc$ is less than or equal to the threshold value tc2, the routine is advanced from the step 137 to a step 139, and the current lock-up learning correction amount PL is maintained and stored as it is.

In the control by this flow chart, as described above, when the vehicle starts running and the operation enters one of these lock-up regions, with the lock-up learning correction amount PL set at "0" in the initial flow, command oil pressure (Ps, Pc or Pu) according to the kinds of lock-up is generated, and at the same time an effective lock-up learning correction amount PL is determined based on the progress result of the lock-up and stored. Then, in the subsequent lock-up, the learning control is further continued with a command oil pressure which has incorporated the lock-up learning correction amount PL stored in the preceding lock-up.

In this case, particularly, even when the subsequent lock-up region differs from the preceding lock-up region, the preceding lock-up learning correction amount PL which has been learned in another lock-up and stored is incorporated to set a command oil pressure for this new lock-up. This is because the lock-up learning correction amount PL corresponds to the lock-up clutch 4 or the individual difference and aging of oil circuit and therefore can be commonly used regardless of kinds of lock-up regions.

Thereby, the lock-up learning correction amounts PL obtained in each lock-up are effectively used, and a proper lock-up learning correction amount can be quickly obtained compared with the case where a lock-up learning correction amount is separately determined for each kind of lock-up region, as a result of which a proper initial command pressure can be early achieved and a lock-up as set can be executed regardless of kinds of lock-up regions.

For example, even when the operation first enters the coasting lock-up region after the proper lock-up learning correction amount PL is obtained by repeating a slip lock-up or a complete lock-up, a coasting lock-up basic initial pressure can be corrected using the lock-up learning correction amount PL obtained in the slip lock-up region or in the complete lock-up region.

In the embodiment as described above, an initial command oil pressure of a lock-up control of one of the plurality of lock-up regions is set by using a lock-up learning correction amount calculated by a learning control in a lock-up control of the other of the plurality of lock-up regions when the lock-up control of the other of the plurality of lock-up regions is performed before the lock-up control of the one of the plurality of lock-up regions. Thus, a lock-up learning correction amount can be commonly used among three kinds of lock-up regions, and a lock-up as set is early realized in each lock-up region.

And in the lock-up control of the coasting lock-up region, a difference between a command oil pressure Pc in a state where the torque converter achieves a target slip S2 and the initial command oil pressure is set as the lock-up learning correction amount; in the lock-up control of the slip lock-up region, a correction amount corresponding to a difference between an elapsed time ΔTa until the torque converter achieves the target slip S1 and a predetermined time range set for the slip lock-up control is set as the lock-up learning correction amount; and in the lock-up control of the complete lock-up region, a correction amount corresponding to a difference between an elapsed time ΔTc until the torque converter achieves the target slip (=0) and a predetermined time range set for the complete lock-up control is set as the lock-up learning correction amount. Although it may take a long time to obtain a lock-up learning correction amount because a waiting period is required until it is confirmed that a target slip S2 is stabilized and maintained in the coasting lock-up region, however, time for reaching a target slip can be shortened by using a lock-up learning correction amount obtained in the slip lock-up region or the complete lock-up region.

What is claimed is:

1. A lock-up control device for a torque converter of an automatic transmission equipped with a lock-up clutch, including learning control means for performing a learning control of an initial command oil pressure for a lock-up control for each of plurality of lock-up regions according to vehicle running condition, said learning control means setting the initial command oil pressure by adding a lock-up learning correction amount to a basic initial pressure set for each of the plurality of lock-up regions, and setting an initial command oil pressure of a lock-up control of one of the plurality of lock-up regions by using a lock-up learning correction amount calculated by a learning control in a lock-up control of the other of the plurality of lock-up regions when the lock-up control of the other of the plurality of lock-up regions is performed before the lock-up control of the one of the plurality of lock-up regions.

2. A lock-up control device for a torque converter of an automatic transmission according to claim 1, wherein the one of the plurality of lock-up regions is a coasting lock-up region and the other of the plurality of lock-up regions is a slip lockup region or a complete lock-up region, or the one of the plurality of lock-up regions is a slip lock-up region or a complete lock-up region and the other of the plurality of lock-up regions is a coasting lock-up region.

3. A lock-up control device for a torque converter of an automatic transmission according to claim 2, wherein in the lock-up control of the coasting lock-up region, a difference between a command oil pressure in a state where the torque converter achieves a target slip and the initial command oil pressure is set as the lock-up learning correction amount; in the lock-up control of the slip lock-up region, a correction amount corresponding to a difference between an elapsed time until the torque converter achieves the target slip and a predetermined time range set for the slip lock-up control is set as the lock-up learning correction amount; in the lock-up control of the complete lock-up region, a correction amount corresponding to a difference between an elapsed time until the torque converter achieves the target slip and a predetermined time range set for the complete lock-up control is set as the lock-up learning correction amount.

* * * * *

UNITED STATES PATENT AND TRADEMARK OFFICE
CERTIFICATE OF CORRECTION

PATENT NO.    : 6,637,566 B2
DATED         : October 28, 2003
INVENTOR(S)   : Kazuhiro Takatori et al.

It is certified that error appears in the above-identified patent and that said Letters Patent is hereby corrected as shown below:

<u>Title page,</u>
Item [73], Assignee, please change "Jacto Ltd" to -- Jatco Ltd --

Signed and Sealed this

Second Day of March, 2004

JON W. DUDAS
*Acting Director of the United States Patent and Trademark Office*